United States Patent Office 3,567,244
Patented Mar. 2, 1971

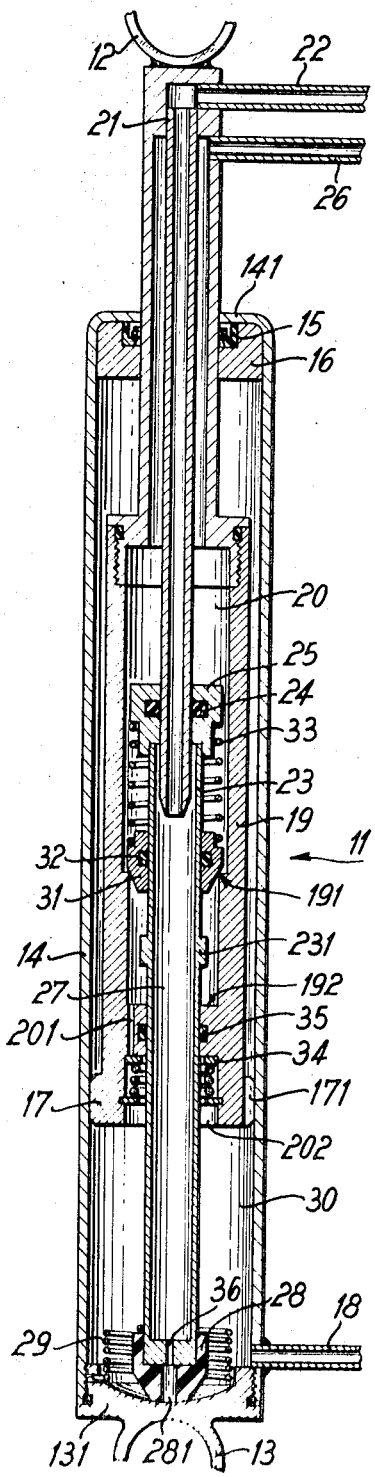

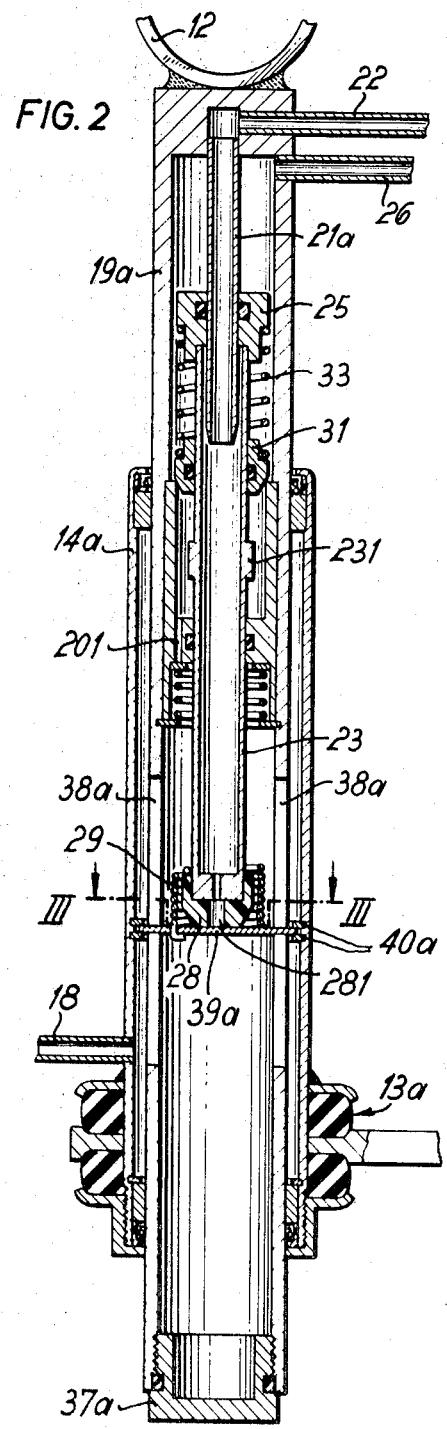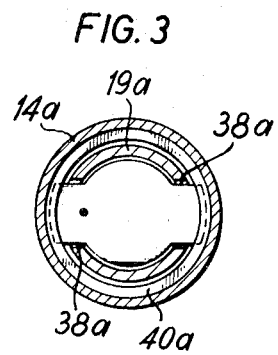

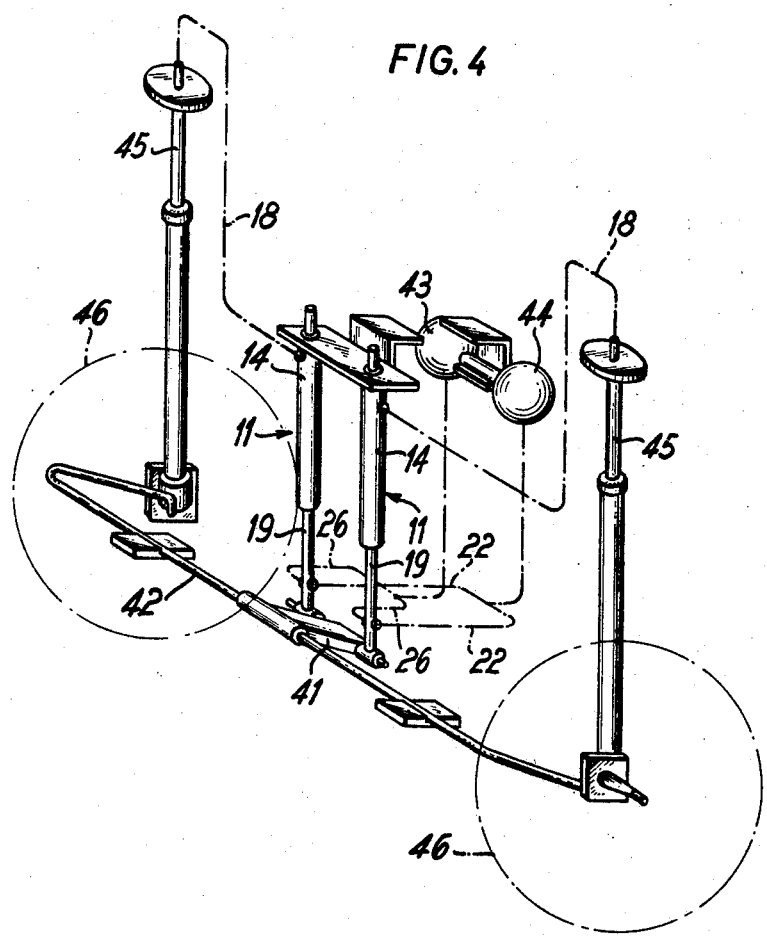

3,567,244
LEVEL REGULATING UNIT
Hans-Jürgen Hoffmann, Hohenlimburg, and Manfred Löhr, Letmathe, Germany, assignors to Hoesch Aktiengesellschaft, Dortmund, Germany
Filed Nov. 20, 1968, Ser. No. 777,394
Claims priority, application Germany, Nov. 23, 1967,
P 16 30 067.7
Int. Cl. B60g 17/04
U.S. Cl. 280—124　　　　　　　　　　14 Claims

ABSTRACT OF THE DISCLOSURE

A level regulating unit for pneumatic or hydro-pneumatic springs, especially for automotive vehicles having a chassis assembly and a wheel assembly movable in substantially vertical direction toward and away from each other thereby increasing the gas pressure of the springs during movement of the assemblies toward each other and reducing the gas pressure during movement of the assemblies away from each other. The level regulating unit includes a pair of telescopically arranged members respectively connected to the chassis and the wheel assembly for movement in vertical direction therewith and defining a working space communicating with the fluid space of the springs, and control means for connecting the working space to a high pressure space when the telescoping members move in one direction relative to each other, or to a low pressure space during movement of the members in the opposite direction.

BACKGROUND OF THE INVENTION

The present invention relates to a level regulating unit for pneumatic or hydropneumatic spring arrangements, especially for automotive vehicles in which such spring arrangements are provided between the chassis and the wheel assembly of the vehicle.

Regulating units are known in the art which comprise electrical contacts, which are for instance connected to the chassis of the vehicle, and which control, by means of a lever system or a cable, electrical valves in such a manner to increase or decrease the distance between chassis and wheel assembly when this distance deviates by a predetermined amount from the desired distance. Such an arrangement is bulky and liable to function improperly due to fouling, which is unavoidable in practical use.

Level regulating units are also known in the art which operate according to a rotary slide valve principle. In this construction, proper sealing between the high pressure and the low pressure space is difficult, since the connections to the aforementioned spaces are sealed by the rotary slide valve. Proper sealing, however, is decisive for the reliability of such regulators.

Level regulating units are also known in which the relative movement between the wheel axis and the chassis is transmitted through a lever arrangement onto a regulating member, but this known arrangement is also very bulky and requires in adition manufacturing to close tolerances.

Telescopic lever regulating units known in the art either use a slide valve or a sleeve valve which both cause sealing problems and in addition they also have to be manufactured to very close tolerances.

It is an object of the present invention to provide for a level regulating unit which avoids the aforementioned disadvantages of regulating units known in the art.

It is a further object of the present invention to provide a regulating unit which is simple in construction, which will stand up properly under extended use and which is usable in connection with pneumatic as well as hydropneumatic spring arrangements.

It is an additional object of the present invention to provide for a level regulating unit of the aforementioned kind in which the necessary seals will not be subjected to excessive wear.

SUMMARY OF THE INVENTION

With these objects in view, the level regulating unit according to the present invention for pneumatic or hydropneumatic springs, especially for automotive vehicles having a chassis assembly and a wheel assembly movable in substantially vertical direction relative to each other, mainly comprises an outer working cylinder adapted to be connected to one of the assemblies for movement in vertical direction therewith, an inner hollow cylinder located in part in said outer cylinder and defining therewith in the interior of the outer cylinder a working space. The inner cylinder projects with at least one closed end fluid-tightly guided in the corresponding end of the outer cylinder beyond the latter so as to be movable in axial direction relative to the outer cylinder. The inner cylinder is connected at the aforementioned one end to the other of the assemblies for movement therewith. The unit includes further level regulating means comprising a plurality of control elements guided in the inner cylinder for axial movement relative thereto and co-operating therewith for connecting the working space with a high pressure space when the inner cylinder moves in one direction relative to the outer cylinder and for connecting the working space with a low pressure space when the inner cylinder moves in the opposite direction relative to the outer cylinder. Conduit means connect the working space with the fluid space of the pneumatic or hydropneumatic springs. The control elements which control flow of fluid between the working space and the high or the low pressure space comprise lift valves. The aforementioned one end of the inner cylinder is connected by a conduit to the high pressure space and the control elements include further a tube fixed at one end thereof to the one end of the inner cylinder and projecting from the connected end into the interior of the inner cylinder.

The tube is connected at the one end thereof to the low pressure space and an axial movement control tube is fluid-tightly guided at one end thereof on the fixed tube in the region of the other end of the latter. The control tube projects with the other end thereof fluid-tightly guided through and beyond a wall extending axially spaced from said one end of said inner cylinder through the latter.

The inner cylinder is provided in the interior thereof with a valve seat and one of the lift valves comprises a valve member slidably guided on the control tube and engaging in a rest position of the inner cylinder the valve seat, whereas abutment means on the control tube co-operate with the valve member for disengaging the same from the valve seat during movement of the inner cylinder in the aforementioned one direction relative to the outer cylinder. The other of the lift valves comprises a plug fixed to the outer end of the control tube and formed with an axial bore therethrough. Spring means are preferably provided in the inner cylinder which co-operates with the slidable valve member for yieldably pressing the latter against the valve seat.

According to a further feature of the present invention, a throttle bore extending through the transverse wall of the inner cylinder provides communication between the interior thereof and the aforementioned working space. A one-way valve co-operates with the aforementioned throttle bore for permitting flow of pressure fluid from the interior of the inner cylinder into the working space while preventing flow of fluid in the reverse direction. Furthermore, the control tube is substantially closed at its other end and provided in the closed end with a throttle bore axially aligned with the bore in the plug.

The inner cylinder may have an outer diameter smaller than the inner diameter of the outer cylinder and a piston fixed to the other end of the inner cylinder and engaging with its outer surface the inner surface of the outer cylinder may serve to guide the other end of the inner cylinder. On the other hand, a plate fixed to and extending transversely through the outer cylinder substantially midway between opposite ends of the latter may be provided and in this arrangement the inner cylinder projects with opposite closed ends respectively through and beyond the opposite ends of the outer cylinder and is formed in a portion immediate the ends thereof with diametrically oppositely arranged axially extending elongated openings through which opposite end portions of the aforementioned plate extend. In this arrangement the plug engages with its bottom end the plate when the inner cylinder is in its rest position and an abutment face of the inner cylinder cooperates with the aforementioned abutment on the control tube for lifting the latter during movement of the inner cylinder in upward direction against the pressure of a spring arranged for yieldably maintaining the bottom end of the plug in engagement with the plate.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a cross section through one embodiment of the level regulating unit according to the present invention and showing the various elements in their rest position;

FIG. 2 is a cross section through a second embodiment according to the present invention in which the elements are likewise shown in their rest position;

FIG. 3 is a cross section taken along the line III—III of FIG. 2; and

FIG. 4 is a schematic perspective view illustrating the arrangement of two level regulating units in connection with the wheel and strut assembly of an automotive vehicle.

DESCRIPTION OF THE PREFERRED EMBODIMENTS

Referring now to the drawings and more specifically to FIG. 1 of the same, it will be seen that the level regulating unit 11 illustrated therein comprises an outer or working cylinder 14 and an inner hollow cylinder or hollow piston rod 19 axially movable with respect to the outer cylinder. The outer cylinder 14 is provided at its lower end with a ring-shaped attachment 13, only partially shown in FIG. 1, which may be integrally formed with a bottom 131 threadingly connected to the lower end of the outer cylinder. The attachment 13 may serve to connect the outer cylinder to the wheel axle of an automotive vehicle. At the upper end the outer cylinder 14 is closed by the inwardly bent portion 141 thereof which receives a guide member 16 and an annular seal 15 through which the upper end of the inner cylinder or hollow piston rod 19 projects upwardly beyond the upper end of the outer cylinder, while being fluid-tightly guided in the annular guide member 16 and the annular seal 15. An annular connecting member 12, only partially shown in FIG. 1, is fixedly connected to the upper end of the hollow piston rod 19 by means of which the latter may, for instance, be connected to the chassis of an automotive vehicle. The hollow piston rod 19 has an outer diameter smaller than the inner diameter of the outer cylinder 14 and the hollow inner cylinder or piston rod 19 is guided at its lower end by a piston 17 fixed thereto by being for instance integrally formed therewith. The piston 17 is formed with a plurality of axially extending passages 171 therethrough, only one of which is shown in FIG. 1, so that the annular space between the outer surface of the inner cylinder and the inner surface of the outer cylinder will communicate with the working space 30 located between the bottom end of the piston 17 and the bottom 131 of the outer cylinder. This working space 30 is connected by a conduit 18 to a pneumatic or hydropneumatic spring 45 extending between the chassis and the axle of a wheel assembly of an automotive vehicle as schematically indicated in FIG. 4.

A tube 21 fixed at its upper end to the upper end of the piston rod 19 projects coaxially therewith into the bore 20 of the latter. The upper end of the fixed tube 21 is connected by means of a conduit 22 to a low pressure space 44 as schematically indicated in FIG. 4. The opposite free end of the tube 21 extends into the upper end of a control tube 23 which is received in part in the bore 20 of the piston rod and which extends fluid-tightly sealed by an annular seal 35 through and beyond the lower end of the latter. A guide head 25 fixed to the upper end of the control tube 23 and provided with an annular seal 24 guides the control tube 23 at its upper end on the outer surface of the fixed tube 21. The bore 20 of the hollow piston rod 19 is connected at its upper end by means of a conduit 26 to a high pressure space 43, as schematically shown in FIG. 4. A plug 28 provided with a central bore 281 therethrough and acting as a lift valve is connected to the lower end of the control tube 29 so that the latter is closed at its bottom end when the plug 28 abuts against the bottom 131 of the outer cylinder 14 as shown in FIG. 1. A tension spring 29 connected at opposite ends to the bottom 131 of the outer cylinder and to the plug 28 is biased to yieldably maintain the bottom end of the plug in abutment with the inner face of the member 131. The closed bottom end of the control tube 23 is formed with an axial throttle bore 36 aligned with the bore 281 through the plug. A second lift valve 31 with an annular seal 32 is slidingly arranged on the control tube 23 and abuts in the rest position of the arrangement, as shown in FIG. 1, on a valve seat 191 formed in the interior of the piston rod 19 between the ends of the latter. An annular enlargement 231 on the control tube 23 is adapted to abut with an upper face thereof against a bottom face of the valve member 31 when the piston rod 19 and the control tube 23 move axially with respect to each other in a direction so as to move the control tube 23 further into the bore 20 of the piston rod than shown in FIG. 1. The bore 20 of the piston rod 19 communicates with the working space 30 in the outer cylinder 14 through a throttle bore 201 provided with a one-way valve 34. A coiled compression spring 33 between the guide head 25 and the valve member 31 is biased to press the latter against the valve seat 191.

The above-described level regulating unit 11 will operate as follows:

If the vehicle to which the unit is connected as described above is loaded and the pneumatic or hydropneumatic springs between the chassis and the wheel assembly of the vehicle are contracted, the piston rod or inner cylinder 19 will move into the outer cylinder 14 so that the valve member 31 biased by the spring 33 against the valve seat will move downwardly with the piston rod, until it engages with its bottom face the top face of the abutment 231 so that, during further downward movement of the piston rod 19, the valve member 31 will be lifted from its seat 191 and high pressure fluid from the high pressure space 43 will flow through the conduit 26 into the bore 20 of the piston rod, past the valve seat 191 and through the throttle bore 201 into the working space 30 of the outer cylinder, and from there through the conduit 18 to the fluid space of the springs to cause re-extension of the latter to move the chassis back to its starting position. Simultaneously the piston rod 19 will be moved back in upward direction relative to the outer cylinder so that flow of high pressure fluid to the springs will be again interrupted when the piston rod again assumes the position as shown in FIG. 1 and the valve member 31 will again engage the valve seat 191. The oneway valve 34 and the annular seal 35 are necessary when during repeated loading and unloading of the vehicle, while the latter is at standstill, a pressure equalization between the fluid space of the springs and the high pressure space takes place. The throttle bore 201 providing communicating between the bore 20 of the piston rod and the working space 30 will delay the regulating action of the level regulating unit so that during short opening of the lift valve 31, which may for instance occur during passage of the vehicle over a hole in the ground, no instantaneous level regulating will take place.

During unloading of the vehicle and extension of the springs 45, the piston rod 19 will move out of the outer cylinder 14 to a greater extent than shown in FIG. 1, so that the face 192 of the transverse wall of the piston rod will engage the bottom face of the abutment 231 to thereby lift the control tube 23, so that the bottom face of the plug 21 will be lifted from the inner face of the bottom 131 of the outer cylinder, to thereby connect the working space 30 with the low pressure space 44, so that pressure fluid from the springs may flow through the conduit 18 into the working space 30 and from there through the bore 281 and the throttle bore 36, into the interior 27 of the control tube 23, and from the latter through the tube 21 and the conduit 22 to the low pressure space. The springs 45 will thereby contract again, which in turn will cause the piston rod 19 to reverse its movement and the level adjustment will be terminated when the plug 21 engages again the bottom 131 of the working cylinder 14.

A second embodiment of a level regulating unit according to the present invention is illustrated in FIGS. 2 and 3. A suffix *a* is added to the reference numerals designating elements of the embodiment shown in FIGS. 2 and 3 which have the same function as the elements of the embodiment shown in FIG. 1, but which differ in their configuration from the elements of the first embodiment. The level regulating unit shown in FIGS. 2 and 3 differs from the embodiment illustrated in FIG. 1 in that the hollow inner cylinder or piston rod 19a is considerably longer than the piston rod 19 shown in FIG. 1 and extends with opposite ends fluid-tightly sealed through and beyond the opposite ends of the outer cylinder 14a. The hollow inner cylinder 19a is closed by a cover 37a at its end protruding beyond the lower end of the outer cylinder 14a which is provided with a connection 13a through which the outer cylinder may be connected, for instance, to the wheel assembly. The inner cylinder 19a is further provided with intermediate its ends with diametrically oppositely arranged longitudinal openings 38a through which opposite portions of a plate 39a extend, which is fixedly connected to the outer cylinder 14a by a pair of snap rings 40a substantially midway between the opposite ends of the outer cylinder and extending substantially normal to the axis thereof. The plug 28 at the bottom end of the control tube 23 is yieldably held in abutment with the upper surface of the plate 39a by a tension spring 29 connected at opposite ends to the plate 39a and the plug 28. The control tube 23 is again provided with an abutment 231 adapted to co-operate with a lift valve 31 slidably guided on the outer surface of the control tube 23 and a tube 21a fixed at its upper end to the upper end of the piston rod 19a telescopically extends with a lower portion thereof into the control tube 23 and is fluid-tightly guided at this lower portion by the guide member 25 fixed to the upper end of the control tube. The upper end of the fixed tube 21a is again connected through a conduit 22 to a low pressure space, whereas the interior of the inner cylinder or piston rod 19a is connected at its upper end by the conduit 26 to a high pressure space. Since the inner cylinder 19a is guided for axial movement relative to the outer cylinder 14a in the opposite ends of the latter, a guide piston connected to the inner cylinder is not necessary. This arrangement has also the advantage that the inner cylinder 19a is during its operation not subjected to any compression forces.

The arrangement shown in FIGS. 2 and 3 operates in the same manner as the arrangement described in connection with FIG. 1.

FIG. 4 schematically illustrates the use of level regulating units according to the present invention in an automotive vehicle for maintaining the chassis and the wheel assembly of the vehicle at a predetermined distance from each other, regardless of loading or unloading of the chassis. As shown in FIG. 4, a pair of substantially parallelly arranged level regulating units 11 are provided, the piston rods 19 of which are connected by a connecting piece 41 to a turnable stabilizer 42 of known construction, only schematically illustrated in FIG. 4. The stabilizer 42, in turn, is connected at the outer ends thereof to the bottom ends of pneumatic or hydropneumatic springs of known construction, which in turn extend between the axles of the wheel 46 and the chassis of the vehicle, not shown in the drawing. The outer cylinders 14 of the two units are connected in the manner as described before, in this case to the chassis of the vehicle and the working space of these cylinders communicates through the conduits 18 with the pneumatic or hydropneumatic springs 45, whereas the high pressure space 43 and the low pressure space 44 are respectively connected through the conduits 22 and 26 to the elements of the units 11 in the manner as described above. During any change of the load on the vehicle, the chassis and the wheel assembly will move relative to each other so that the stabilizer 42 will turn and this turning movement will be transmitted over the connecting member 41 to the piston rods 19 of the unit 11 causing thereby the level control action as described above. Thereby pressure fluid will flow during contraction of the springs 45 from the high pressure space 43 into the fluid space of the springs, or pressure fluid will flow from the latter to the low pressure space 44 to cause re-expansion or re-contraction of the springs until the stabilizer 42 reaches again its normal position which will stop further flow of pressure fluid into or out from the fluid space of the springs 45.

It will be understood that each of the elements described above, or two or more together, may also find a useful application in other types of level regulating units differing from the types described above.

While the invention has been illustrated and described as embodied in a level regulating unit for pneumatic or hydropneumatic springs especially for automotive vehicles, it is not intended to be limited to the details shown, since various modifications and structural changes may be made without departing in any way from the spirit of the present invention.

Without further analysis, the foregoing will so fully reveal the gist of the present invnetion that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A level regulating unit for pneumatic and hydropneumatic springs cooperating with a high pressure space and a low pressure space, especially for automotive vehicles having a chassis assembly and a wheel assembly with such springs extending therebetween so that said assemblies may move from a rest position in substantially vertical direction relative to each other to thereby increase the pressure in a fluid space of said springs during movement of said assemblies toward each other and to decrease the pressure in such fluid space during movement of said assemblies away from each other, said level regulating unit comprising an outer working cylinder connected at one end thereof to one of said assemblies; an inner hollow cylinder located in part in said outer cylinder and defining therewith in the interior of said outer cylinder a working space, said inner cylinder extending at least with one end thereof fluid-tightly guided through the other end of said outer cylinder so as to be movable in axial direction relative to the latter and being connected at said one end thereof to the other assembly for movement therewith; a conduit connecting said working space with said fluid space of said springs; and means for connecting said working space with said high pressure space to permit controlled flow of fluid from the latter to said fluid space of said springs when said cylinders move in one direction relative to each other and for connecting said working space to said low pressure space to permit controlled flow of pressure fluid from said fluid space of said springs to said low pressure space when said cylinders move in the opposite direction relative to each other, said means comprising axially guided and in part telescopically arranged control elements received by said hollow inner cylinder and cooperating therewith.

2. A level regulating unit as defined in claim 1, wherein said control elements comprise lift valves.

3. A level regulating unit as defined in claim 2, including a conduit connecting said one end of said inner cylinder with said high pressure space and said control elements further including a tube fixed at one end thereof to said one end of said inner cylinder and projecting from said one end into the interior of said inner cylinder, said tube being connected at said one end to said low pressure space, and an axially movable control tube fluid-tightly guided at one end thereof on said fixed tube in the region of the other end of the latter, said control tube projecting with the other end thereof fluid-tightly guided through and beyond a wall extending axially spaced from said one end of said inner cylinder transversely through the latter.

4. A level regulating unit as defined in claim 3, wherein said inner cylinder is provided in the interior thereof with a valve seat, wherein one of said lift valves comprises a valve member slidably guided on said control tube and engaging said valve seat, and abutment means on said control tube co-operating with said valve member for moving the same away from said valve seat during movement of said inner cylinder in said one direction relative to said outer cylinder, the other of said lift valves comprises a plug fixed to the other end of said control tube and formed with an axial bore therethrough.

5. A level regulating unit as defined in claim 4, and including spring means in said inner cylinder and co-operating with said slidable valve member for yieldably pressing the latter against said valve seat.

6. A level regulating unit as defined in claim 5, wherein the interior of said inner cylinder communicates with said working space through a throttle bore.

7. A level regulating unit as defined in claim 6, and including one-way valve means co-operating with said throttle bore for permitting flow of pressure fluid from the interior of said inner cylinder into said working space while preventing flow of fluid in the reverse direction.

8. A level regulating unit as defined in claim 7, wherein said inner cylinder has an outer diameter smaller than the inner diameter of said outer cylinder, and including a piston fixed to the other end of said inner cylinder and engaging with the outer surface thereof the inner surface of the outer cylinder so as to guide the inner cylinder at said other end thereof on the inner surface of said outer cylinder, said piston being provided with a central cavity in which said one-way valve is located and in the region of the outer periphery thereof with at least one axial passage.

9. A level regulating unit as defined in claim 6, wherein said other end of said outer cylinder is closed and wherein said plug abuts with its bottom end aganst said closed other end of said outer cylinder, and including an abutment face in the region of said other end of said inner cylinder and co-operating with said abutment means on said control tube for lifting the latter during movement of said inner cylinder in said opposite direction to thereby disengage said plug from said closed end of said outer cylinder to thus connect said working space with said low pressure space.

10. A level regulating unit as defined in claim 9, and including spring means co-operating with said plug for yieldably maintaining the bottom end of the latter in engagement with said other closed end of said outer cylinder.

11. A level regulating unit as defined in claim 10, wherein said control tube is substantially closed at said other end and provided in said closed end with a throttle bore axially aligned with said bore in said plug.

12. A level regulating unit as defined in claim 6, and including a plate extending transversely through said outer cylinder substantially midway between opposite ends thereof and substantially normal to the axis of said outer cylinder and fixedly connected to the latter, and wherein said inner cylinder has an outer diameter smaller than the inner diameter of said outer cylinder and projects fluid-tightly sealed with opposite ends through and beyond opposite ends of said outer cylinder, said inner cylinder being formed in a portion intermediate the ends thereof with diametrically oppositely arranged axially extending elongated openings through which opposite end portions of said plate extend.

13. A level regulating unit as defined in claim 12, wherein said plug engages with its bottom end said plate, and including an abutment face on said inner cylinder and co-operating with said abutment means on said control tube for lifting the latter during movement of said inner cylinder in said opposite direction to thereby disengage said bottom end of said plug from said plate to thus connect said low pressure space with said working space in said outer cylinder.

14. A level regulating unit as defined in claim 13, and including spring means co-operating with said plug for yieldably maintaining the bottom end of the latter in engagement with said plate.

References Cited

UNITED STATES PATENTS

| | | | |
|---|---|---|---|
| 3,140,098 | 7/1964 | Broadwell | 280—6H |
| 3,178,167 | 4/1965 | Menar | 280—124F |
| 3,145,985 | 8/1964 | Carbon | 280—124F |

PHILIP GOODMAN, Primary Examiner

U.S. Cl. X.R.

267—65